Jan. 2, 1951        G. D. MILLER        2,536,763
AUTOMATIC GUIDE PUSH ELEVATOR TRUCK LOADER
Filed May 28, 1947        3 Sheets-Sheet 1
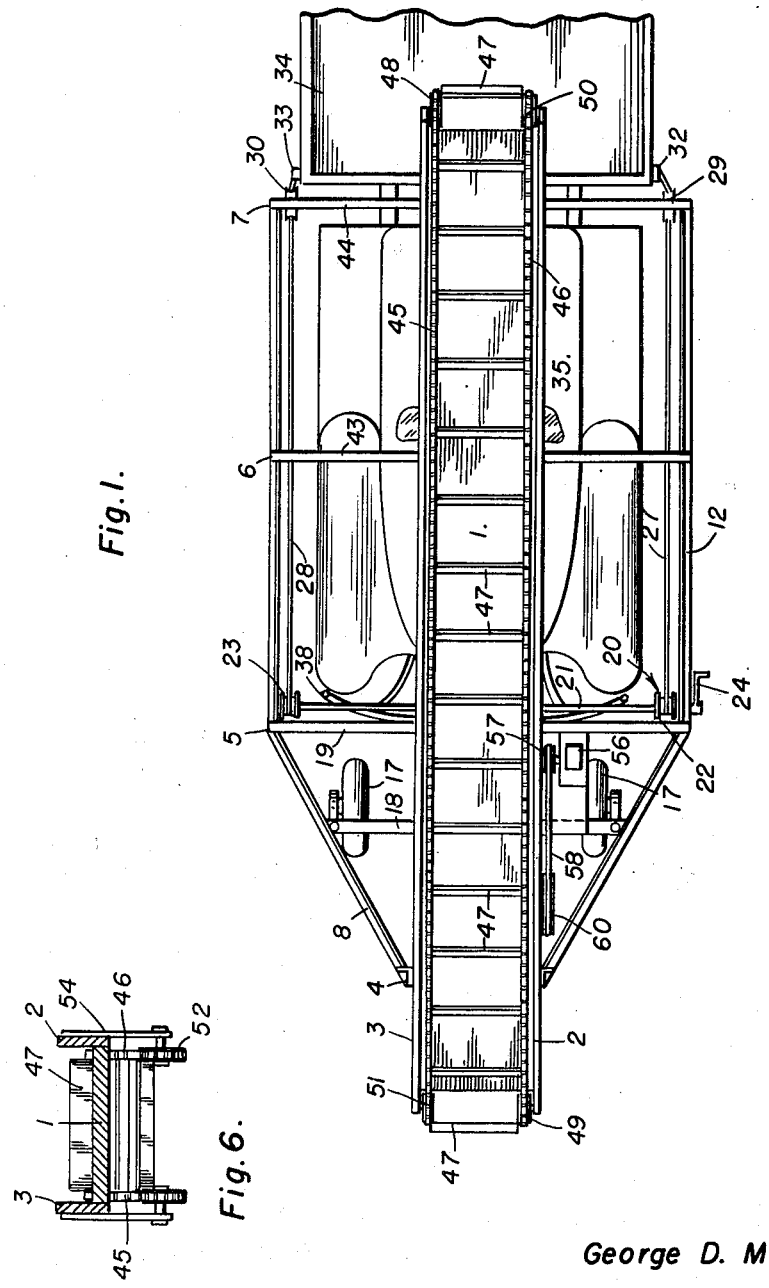
Inventor
George D. Miller
By *Clarence A. O'Brien
and Harvey B. Jacobson*
Attorneys

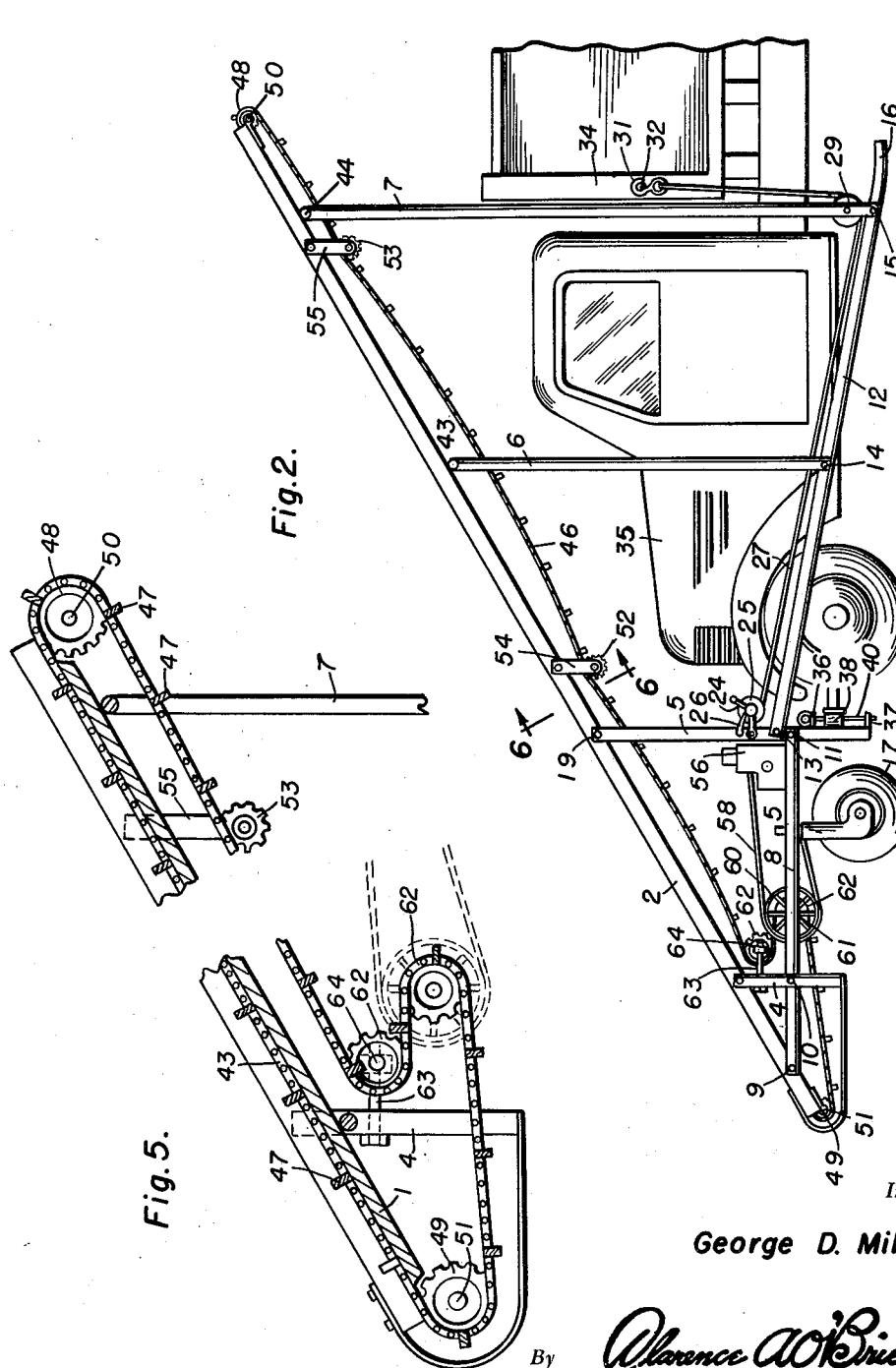

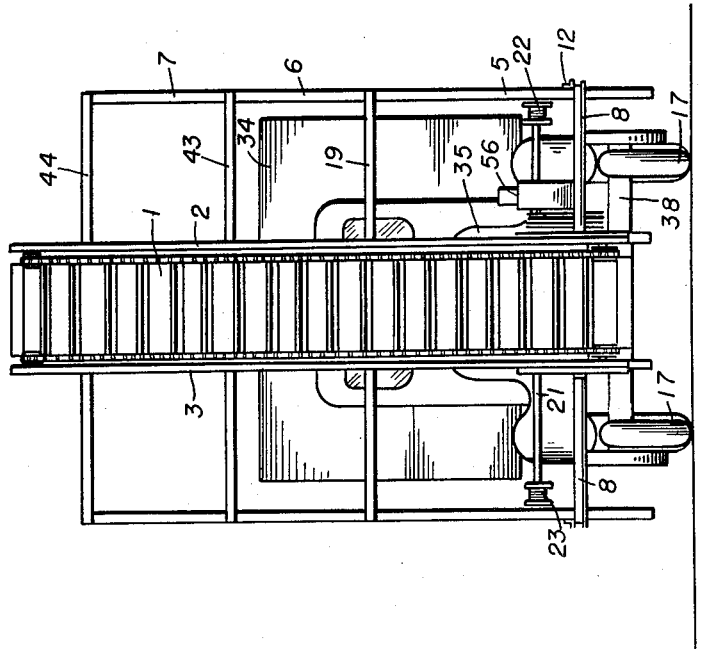
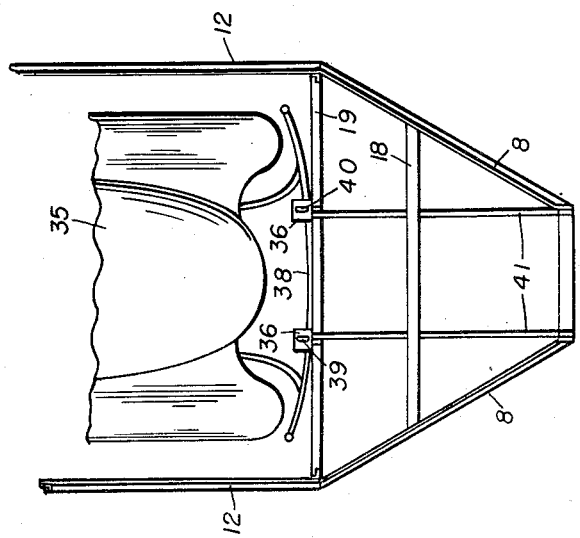
Inventor
George D. Miller

Patented Jan. 2, 1951

2,536,763

UNITED STATES PATENT OFFICE 2,536,763

AUTOMATIC GUIDE PUSH ELEVATOR TRUCK LOADER

George D. Miller, Geneseo, Ill.; Anne Miller, administratrix of said George D. Miller, deceased, assignor to Knute E. Nielsen Application May 28, 1947, Serial No. 750,988

2 Claims. (Cl. 214—83.16)

This invention relates to improvements in automatic guide push elevator truck loaders.

An object of the invention is to provide an improved automatic guide push elevator truck loader which will have a self-contained power driving or operating means, and may be used in any desired position, or may be attached to and supported by a motor truck or vehicle for loading the same.

Another object of the invention is to provide an automatic guide push elevator truck loader comprising a substantially V-shaped frame or chassis having an upwardly and rearwardly extending loading chute in which an endless conveyor is disposed and driven by a small engine or motor supported upon the frame or chassis, said frame or chassis having one or more caster wheels adjacent its forward end, and means for adjustably attaching and securing the same upon a motor vehicle or truck.

A further object of the invention is to provide an improved guide push elevator truck loader for use either separately or attached to a motor vehicle or truck which will be provided with an endless conveyor and a self-contained engine or motor for driving and operating the same, together with a drive sprocket wheel and pulley driven by said engine or motor, and a belt or chain tightener forming a part of the endless conveyor driving means.

Another object of the invention is to provide an improved guide push elevator truck loader which will be highly efficient in operation, and relatively inexpensive to manufacture and produce.

Other objects will appear as the description proceeds.

In the accompanying drawings which form a part of this application,

Figure 1 is a plan view of the improved automatic guide push elevator loader shown attached to and supported by a motor vehicle or truck;

Figure 2 is a side elevation of the improved automatic guide push elevator or loader shown attached to and supported by a motor vehicle or truck;

Figure 3 is a front elevation of the improved automatic guide push elevator or loader shown attached to and supported by a motor vehicle or truck;

Figure 4 is a plan view of the frame or chassis shown attached to and supported by a motor vehicle or truck with the improved automatic guide push elevator or loader removed therefrom;

Figure 5 is a vertical sectional view through the elevator or endless conveyor supported therein showing the drive and belt or chain tightener means therefor, and Figure 6 is a transverse sectional view taken on a line 6—6 of Figure 2.

Like characters of reference are used throughout the following specification and the accompanying drawings to designate corresponding parts.

In carrying out the invention, there is provided an improved automatic guide push elevator truck loader of substantially V-shape in side elevation including an upwardly and rearwardly extending conveyor chute or trough having a bottom 1 and opposite sides or rails 2 and 3, and a plurality of oppositely disposed transversely and longitudinally spaced depending frame members or supporting standards 4, 5, 6 and 7 being progressively longer in length from the front standards 4 to the rear standards 7.

Longitudinally and horizontally extending frame members 8 are secured to the sides or rails 2 and 3, and to the standards 4 and 5, by means of the fastening bolts 9, 10 and 11 respectively.

Rearwardly extending inclined frame members 12 are secured by the bolts 13 to the standards 5, and are also secured to the lower ends of the standards 6 and 7 by means of the bolts 14 and 15, and terminate at their rear ends with the supporting shoes 16.

One or more caster wheels 17 are rotatably supported upon a cross brace or frame member 18 connected between the side frame members 8, and a second cross brace or frame member 19 will be connected between the upper ends of said standards 5, as clearly illustrated in Figures 1, 3 and 4 of the drawings.

A winch 20 will be attached transversely of the standards 5, and includes the cross shaft 21 and pulleys 22 and 23 upon the opposite ends thereof, and a hand operating crank 24 for operating the winch gear 25 which will be held in locked position by means of the pivoted locking dog or pawl 26.

Cables 27 and 28 will be secured to the pulleys 22 and 23, and will extend under the sheaves 29 and 30 attached to the lower ends of the standards 7, after which the cables will extend upwardly to permit the hooks 31 on the terminal ends thereof to engage over the laterally extending pins 32 and 33 supported upon the opposite sides of the body 34 of a motor truck 35, whereby the improved automatic guide push elevator loader may be raised at its rear end from the ground, to be supported upon the caster wheel or wheels 17 and by means of the apertured vertically and transversely spaced supporting ears or flanges 36 and 37 which will extend respectively above and below the bumper 38 of the truck 35, being locked thereto by means of the removable pins 39 and 40 which extends through the apertures (not shown) in said ears or flanges 36 and 37.

A pair of parallel forwardly extending frame members 41 are connected between the cross member 42 and the front ends of the frame members 8, and are secured at their rear ends to a cross member (not shown) disposed between the rear ends of said frame members 8. Also, transverse cross members 43 and 44 are connected between the upper ends of the standards 6 and 7 respectively.

An endless conveyor comprising the spaced link chains 45 and 46 connected together by means of the plurality of spaced cleats 47 is supported upon the upper surface of the conveyor chute or trough bottom 1 and extends about the sprocket wheels 48 and 49 mounted upon the cross shafts 50 and 51 respectively, being disposed at the top and bottom of said chute or trough bottom 1, as clearly illustrated in Figure 2 of the drawings.

Spaced pairs of depending idler sprocket wheels 52 and 53 are supported upon the depending arms 54 and 55 below the conveyor chute, being attached to and supported by the side rails 2 and 3.

A small internal combustion engine 56 or motor of any type will be supported upon a suitable bracket (not shown) preferably disposed between the angled side members 8, and will support a drive pulley 57 about which the belt 58 will extend. The forward end of the belt 58 will extend about a pulley 60 secured to a cross shaft 61 and lies adjacent a sprocket drive wheel 62 which is secured to said shaft 61, said pulley 60 and sprocket drive wheel 62 being simultaneously operable.

Chain tightening sprocket wheel 62 will be adjustably supported by the adjusting screws or bolts 63 and trunnions 64, and will supoprt the endless chains 45 and 46, which will then pass about the driving sprockets 62 to extend forwardly about the sprocket wheels 49.

A guard plate 63 having an arcuate forwardly extending nose portion 64 will be disposed about and below the forward end of the endless conveyor chains 45 and 46, and will be secured in any desired manner to the sides or rails 2 and 3 of the chute bottom 1, and to the lower ends of the vertical standards 4. The object of the guard plate 63 is to prevent injury to persons working at the front end of the loader, and also to protect the conveyor mechanism should the same tilt forwardly and engage the ground.

From the foregoing description, it will be apparent that the mode of operation of the improved automatic guide push elevator truck loader will be as follows: If it is desired to attach the loader to the front end of a truck 35, the truck will be driven up to the loader from the rear end toward the front end thereof until the bumper 38 is received between the upper and lower attaching ears 36, after which the locking pins 40 and 41 will be inserted through the apertures in said ears to positively attach the loader frame to the motor vehicle or truck. The cables 27 and 28 will then be released a sufficient amount to permit the terminal hooks 31 to be placed over the laterally extending pins 32 and 33, after which the handle operator 24 with the attached winch gear 25 will be rotated to take up slack in the cables 27 and 28 and to elevate the rear end of the loader until the rear terminal shoes disposed at the rear ends of the side frame members 12 are elevated the desired distance above the surface of the ground. It will therefore be seen that in this position, the loader will be supported at its forward end upon the castor wheel or wheels 17, and will be secured to the bumper of the motor truck 35, and will be attached at its rear end by means of the cables 27 and 28 and attached terminal hooks 32 to said laterally extending pins 32 and 33.

In this position, it will be apparent that when the motor vehicle or truck 35 is propelled forwardly, the loader mechanism will also be propelled forwardly with it so that any material being received upon the lower end of the endless conveyor will be transported upwardly to the upper end thereof and dumped into the body 34 of the motor vehicle or truck 35.

On the other hand, if it is desired to operate the loader independently of a motor vehicle or truck, the loader will be placed in the desired position so that trucks may drive under the upper end of the conveyor in a transverse direction, and the engine 56 will be started for driving the endless chain conveyor within the chute or trough so that any material delivered into the lower end of the conveyor chute will be carried upwardly therein and deposited over the upper end thereof and into the body of a truck disposed thereunder.

It is also contemplated that it may be desirable to use the loader for supporting a blower pipe (not shown) or an auger pipe (not shown), being mountable upon the same chassis for elevating the material fed to the lower end of the conveyor and to said blower pipe or auger pipe.

From the foregoing description, it will be apparent that there has been devised and provided an automatic guide push elevator truck loader which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. An automatic guide push elevator truck loader comprising a supporting frame having a pair of transversely spaced supporting casters at its forward end, a bumper engaging clamp disposed rearwardly of said caster wheels, winch operated supporting cables disposed at the rear end of said supporting frame adapted to be attached to a motor truck body for manually elevating the rear end of said frame, an upwardly and rearwardly extending chute or trough supported by said frame, an endless chain and cross cleat conveyor disposed in said chute or trough, a combined sprocket wheel and drive pulley rotatably mounted upon said frame, an engine supported on said frame, a belt connected between said engine and said drive pulley, a chain tightener engageable by said endless chain conveyor between the same and said driving sprocket forming a portion of said driving means.

2. An automatic guide push elevator truck loader comprising a substantially V-shape frame having one side thereof extending upwardly and rearwardly, said frame including a plurality of transversely and longitudinally extending spaced vertical standards, cross members connected between the upper ends thereof, an upwardly and rearwardly extending chute or trough supported by said frame, an endless chain and cross cleat conveyor disposed in said chute or trough, frame supported means for driving said endless chain conveyor, chain tightening means therefor forming a part of said drive mechanism, and a guard supported at the front end of said conveyor having an arcuate nose portion overlying the forward extremity of said endless conveyor, a winch mounted on said frame having a cable extending therefrom, a guide disposed at the rear of said frame having said cable extending therearound and adapted to anchor at its end to a truck to raise and lower said frame upon actuation of said winch.

GEORGE D. MILLER.

REFERENCES CITED

The following references are of record in the file of this patent:

UNITED STATES PATENTS

| Number | Name | Date |
| --- | --- | --- |
| 1,474,383 | Russell | Nov. 20, 1923 |
| 1,851,301 | Bunnell | Mar. 29, 1932 |
| 1,987,928 | Eckert | Jan. 15, 1935 |
| 2,199,257 | Ferrin | Apr. 30, 1940 |
| 2,357,549 | Roberson | Sept. 5, 1944 |
| 2,381,892 | Fees | Aug. 14, 1945 |
| 2,431,000 | Step | Nov. 18, 1947 |